United States Patent
Yoon (10) Patent No.: US 8,459,804 B2
(45) Date of Patent: Jun. 11, 2013

(54) PROJECTION DISPLAY DEVICE HAVING SPECIFIED INTERNAL OPTICAL PATH ANGLES

(75) Inventor: Chan Young Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 327 days.

(21) Appl. No.: 12/265,567

(22) Filed: Nov. 5, 2008

(65) Prior Publication Data

US 2009/0128784 A1    May 21, 2009

(30) Foreign Application Priority Data

Nov. 7, 2007    (KR) .................. 10-2007-0112974

(51) Int. Cl.
*G03B 21/28*    (2006.01)
(52) U.S. Cl.
USPC ........................ 353/98; 359/196.1

(58) Field of Classification Search
USPC ............ 353/31, 99, 81, 98; 359/196.1–226.3
See application file for complete search history.

(56) References Cited

U.S. PATENT DOCUMENTS

| | | | | |
|---|---|---|---|---|
| 5,485,225 | A * | 1/1996 | Deter et al. | 348/804 |
| 6,947,459 | B2 * | 9/2005 | Kurtz et al. | 372/43.01 |
| 7,494,227 | B2 * | 2/2009 | Yamazaki et al. | 353/85 |
| 7,891,818 | B2 * | 2/2011 | Christensen et al. | 353/31 |
| 2005/0237497 | A1 * | 10/2005 | Robitaille et al. | 353/99 |
| 2006/0262278 | A1 * | 11/2006 | Chen | 353/30 |
| 2006/0285084 | A1 * | 12/2006 | Lin | 353/84 |
| 2007/0047046 | A1 * | 3/2007 | Ji | 359/208 |
| 2007/0058143 | A1 * | 3/2007 | Penn et al. | 353/102 |

* cited by examiner

*Primary Examiner* — Georgia Y Epps
*Assistant Examiner* — Jerry Brooks
(74) *Attorney, Agent, or Firm* — Birch, Stewart, Kolasch & Birch, LLP (57) ABSTRACT

A projection display device is discussed, which includes an optical system having an improved arrangement, thereby being capable of reducing the size of the projection display device.

7 Claims, 7 Drawing Sheets

PROJECTION DISPLAY DEVICE HAVING SPECIFIED INTERNAL OPTICAL PATH ANGLES

This application claims the priority benefit of Korean Patent Application No. 10-2007-0112974, filed on Nov. 7, 2007 in Republic of Korea, which is hereby incorporated by reference as if fully set forth herein.

BACKGROUND

1. Field

The present invention relates to a projection display device for projecting an image onto an external screen, to display the projected image on the external screen.

2. Background

Various large-screen display devices have been developed and commercially available. Examples of such devices are a liquid crystal display device, a plasma display device, and a projection display device.

Among such large-screen display devices, the projection display device is generally referred to as a "projector". The projector projects an image onto an external screen using an optical engine, and thus displays the image.

Such a projector is an apparatus capable of conveniently implementing a large-screen display. Recently, a projector having an ultra-mini size has been developed. Such a projector is referred to as a "pico-projector". This projector is mainly equipped in a portable terminal.

SUMMARY OF THE INVENTION

The present invention provides a projection display device having a structure that allows the size and/or cost of the projection display device to be reduced or minimized.

An object of the present invention is to provide a projection display device having one or more optical elements for reflecting a light emitted from an illumination optical unit at an acute angle to an integrator, so as to reduce the size of the projection display device effectively.

Another object of the present invention is to provide a projection display device which addresses the limitations and disadvantages associated with the related art projection display devices.

According to an embodiment, the present invention provides a projection display device, comprising: an illumination optical unit configured to emit a light for illumination; an integrator configured to convert the light received from the illumination optical unit into a uniform light; an image projection unit configured to project an image onto an external screen, using the uniform light emitted from the integrator; and a reflection mirror arranged between the illumination optical unit and the integrator, to reflect the light emitted from the illumination optical unit at a first acute angle to the integrator.

According to an embodiment, the present invention provides projection display device comprising: an illumination optical unit configured to emit a light for illumination; an integrator arranged on a first optical path, to convert the light emitted from the illumination optical unit into a uniform light; and an image projection unit configured to receive the uniform light emitted from the integrator and to project a light on a second optical path so as to project an image onto an external screen, wherein the integrator and the image projection unit are arranged such that the first and second optical paths form an acute angle.

The foregoing and other objects, features, aspects and advantages of the present invention will become more apparent from the following detailed description of the preferred embodiments of the present invention when taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention associated with a projection display device, examples of which are illustrated in the accompanying drawings. However, the scope of the present invention is not limited to the following embodiments and drawings. Although a suffix "module" or "unit" is used for constituent elements described in the following description, it is intended only for easy description of the specification. The suffix itself has no meaning or function to distinguish the constituent element using the suffix from the constituent element using no suffix.

It can be appreciated by a skilled person that the projection display device according to various embodiments of the present invention may be implemented in the form of a pico-projector, and may be internally or externally equipped in an electronic device including a portable terminal such as a mobile phone, a smart phone, a notebook (laptop) computer, a digital broadcast terminal, a personal digital assistant (PDA), a portable multimedia player (PMP), a GPS, or a navigation terminal, or in a fixed terminal such as a digital TV or a desktop computer.

Hereinafter, the constituent elements of the projection display device according to an embodiment of the present invention will be described with reference to FIG. 1.

Figure 1:
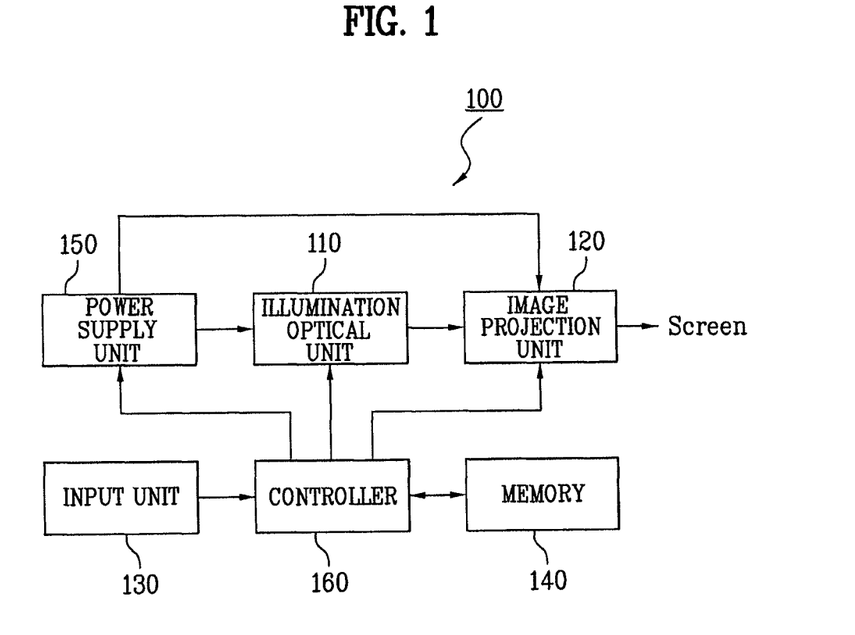
FIG. 1 is a functional block diagram schematically illustrating a projection display device according to an embodiment of the present invention.

FIG. 1 is a functional block diagram schematically illustrating the projection display device according to an embodiment of the present invention.

First, the overall configuration of the projection display device 100 according to the present invention will be described with reference to FIG. 1.

The projection display device 100 according to the present invention includes an illumination optical unit 110, an image projection unit 120, an input unit 130, a memory 140, a power supply unit 150, and a control unit 160. All the components of the projection display device 100 are operatively coupled and configured.

Of course, the projection display device 100 according to the present invention may further include other elements, if necessary or desired, in addition to the above-described constituent elements. However, no detailed description will be given of these additional elements, for simplicity of description, because the additional elements have no direct relation with the present invention.

Meanwhile, it should be noted that each of the above-described constituent elements may be combined with another constituent element to form one constituent element, or may be divided into two or more constituent elements.

Now, the constituent elements of the projection display device 100 according to an embodiment of the present invention will be described in more detail.

The illumination optical unit 110 includes a light source 111 (e.g., 111a, 111b, 111c in FIGS. 3-5), a synthesizer 112 (e.g., 112a, 112b in FIGS. 3-5), and an integrator 113.

The image projection unit 120 projects an image onto an external screen, using the light emitted from the illumination optical unit 110, to provide the image to a user.

The input unit 130 includes one or more of a key pad, a dome switch, a touch pad (constant voltage/constant current), buttons, switches, a jog wheel, a jog switch, etc. The input unit 130 generates input data, which is used to control the operation of the projection display device 100 according to the present invention.

Where the projection display device 100 according to the present invention is internally or externally equipped in a portable terminal such as a mobile phone, a smart phone, a notebook (laptop) computer, a digital broadcast terminal, a PDA, a PMP, or a navigation terminal, or in a fixed terminal such as a digital TV or a desktop computer, the input unit 130 may be an operating unit equipped in the portable terminal or fixed terminal.

The memory 140 may store therein programs and any other information/data for controlling the projection display device 100 according to the present invention, or may perform functions for temporarily storing input/output data.

The memory 140 may include at least one storage medium selected from a flash memory type memory, a hard disk type memory, multimedia card micro type memory, a card type memory (for example, an SD or XD memory), a random access memory (RAM), a static random access memory (SRAM), a read-only memory (ROM), an electrically-erasable programmable read-only memory (EEPROM), a programmable read-only memory (PROM), a magnetic memory, a magnetic disc, and an optical disc.

The power supply unit 150 supplies power to the constituent elements of the projection display device 100 under the control of the control unit 160.

The control unit 160 controls the overall operation of the projection display device 100 according to the present invention. When a key signal for driving the projection display device 100 is input through the input unit 130, the control unit 160 controls the illumination optical unit 110 and image projection unit 120, to project an image onto the screen.

Where the projection display device according to the present invention is internally or externally equipped in a portable terminal such as a mobile phone, a smart phone, a notebook (laptop) computer, a digital broadcast terminal, a PDA, a PMP, or a navigation terminal, or in a fixed terminal such as a digital TV or a desktop computer, the control unit 160 may be a controller equipped in the portable terminal or fixed terminal.

The projection display device 100 according to the present invention having the above-described configuration can have a reduced or minimal size because the angle between the optical incidence and outgoing paths of the image projection unit 120 is an acute angle, which is smaller than the right angle. As a result, a more compact projection display device can be provided.

Figure 2:
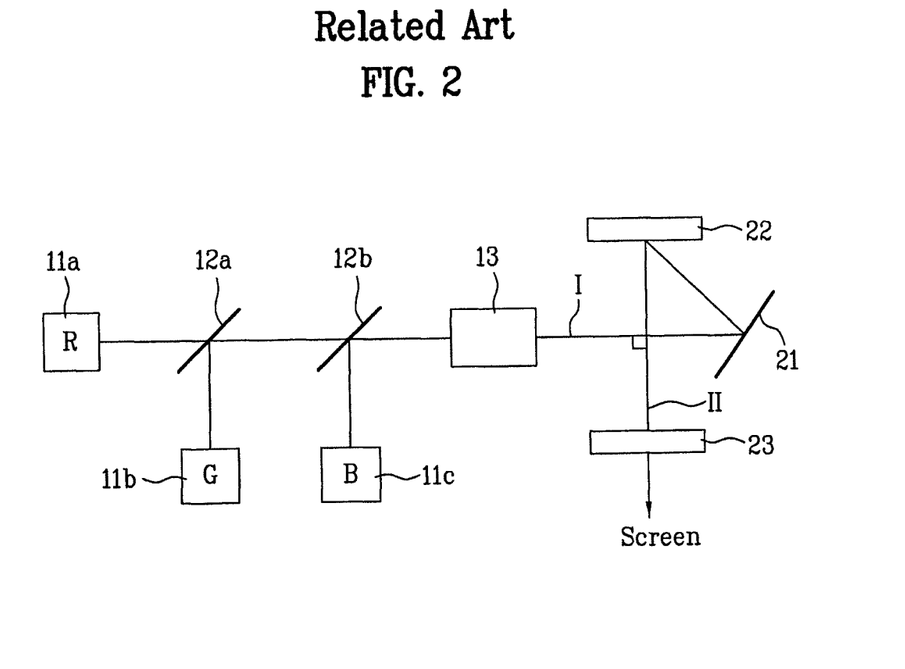
FIG. 2 is a schematic view illustrating a projection display device according to a related art.

For contrasting purposes, FIG. 2 is a schematic view illustrating a projection display device according to the related art. As shown in FIG. 2, the conventional projection display device includes an illumination optical unit 10 for emitting light, a display element 22 for producing an image using the light emitted from the illumination optical unit 10, a reflection mirror 21 for reflecting the light emitted from the illumination optical unit 10 toward the display element 22, and a projection optical unit 23 for projecting the image produced by the display element 22 onto an external screen. The illumination optical unit 10 includes first to third light sources 11a, 11b, and 11c for emitting red (R) light, green (G) light, and blue (B) light, respectively, two dichroic mirrors 12a and 12b, and an integrator 13 for converting the light emerging from the dichroic mirrors 12a and 12b into a uniform light.

As shown in FIG. 2, the integrator 13 is arranged on a light incidence path I of the display element 22. The projection optical unit 23 is arranged on a light outgoing path II of the display element 22. The light incidence path I, on which the integrator 12 is arranged, and the light outgoing path II, on which the projection optical unit 23 is arranged, form a right angle therebetween. As a result, the conventional projection display device of FIG. 2 has a problem in that there is a limitation in miniaturizing the projection display device because the integrator 13 is longitudinally arranged along the optical incidence path I and the paths I and II form a right angle, so that the occupation space of the components of the related art projection display device is large.

To address these limitations and disadvantages associated with the related art projection display devices, in accordance with the present invention, the angle between the light incidence path and the light outgoing path is adjusted to be within an acute angle range. Also, the integrator 113 is arranged on the adjusted light incidence path, and the image projection unit 120 is arranged on the adjusted light outgoing path. Accordingly, it is possible to reduce the overall size of the projection display device 100 effectively in the present invention.

Hereinafter, embodiments of the present invention will be described in detail with reference to FIGS. 3 to 9. The projection display devices of FIGS. 3-9 preferably have the functional components shown in FIG. 1, but may have other or additional components.

Figure 3:
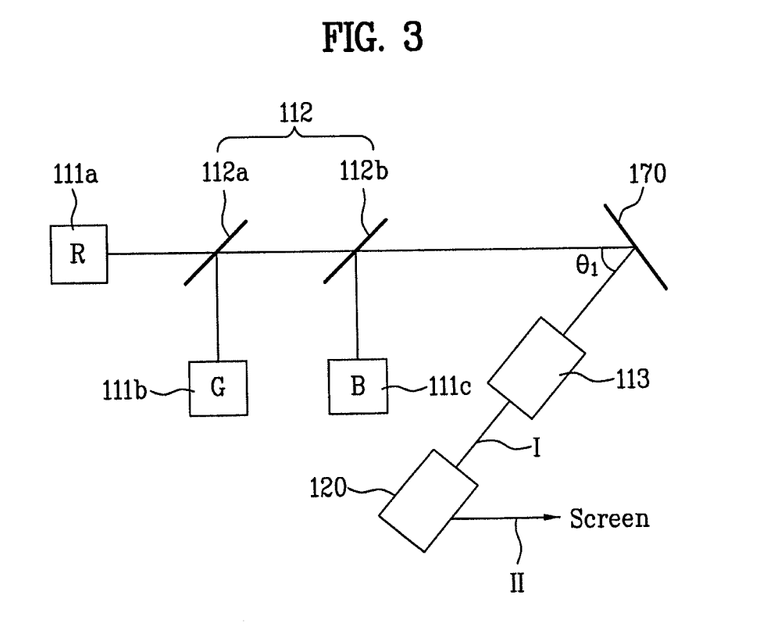
FIG. 3 is a schematic view illustrating a first embodiment of a projection display device according to the present invention.

FIG. 3 is a schematic view illustrating a first embodiment of the projection display device according to the present invention.

Referring to FIG. 3, the illumination optical unit 110 (light source unit) of the projection display device includes first to third light emitting diodes (LEDs) 111a, 111b, and 111c for emitting R light, G light, and B light, respectively. The LEDs 111a, 111b, and 111c generate and emit the R light, G light, and B light, respectively, in accordance with the drive current supplied from the power supply unit 150 under the control of the control unit 160. In another example, the light source unit 110 may include laser diodes or other types of light sources, in place of the LEDs.

The synthesizer 112 (112a, 112b) performs a selective transmission/reflection for the light emitted from the light source unit 110, and then sends the resultant light toward the image projection unit 120, in order to produce an image.

The synthesizer 112 may include a plurality of dichroic mirrors, for example, first and second dichroic mirrors 112a and 112b. Each of the first and second dichroic mirrors 112a and 112b is a mirror for selectively reflecting or transmitting only the light of a particular wavelength, to obtain the light of a desired wavelength band. Each of the first and second dichroic mirrors 112a and 112b transmits or reflects a selected one of the light beams emitted from the LEDs 111a, 111b, and 111c.

Particularly, the first dichroic mirror 112a may be arranged at a position where the R light and G light cross each other. As a result, the first dichroic mirror 112a is configured to transmit the R light while reflecting the G light, so that it emits the R light and G light.

The second dichroic mirror 112b is configured to transmit the R light and G light emerging from the first dichroic mirror 112a while reflecting the B light, so that it emits the R light, G light, and B light.

Thus, the R light, G light, and B light are synthesized while they are processed through the two dichroic mirrors 112a and 112b so that they produce the light of various colors in accordance with an image to be produced.

Although the above description has been given under the assumption that the first dichroic mirror 112a is arranged at the position where the R light and G light cross each other, the positions of the dichroic mirrors 112a and 112b according to the present invention are not limited thereto, and can vary as applicable.

Meanwhile, although not shown in FIG. 3, a condensing lens and/or a collimating lens may be arranged between each of the LEDs 111a, 111b, and 111c and the corresponding mirror 112a or 112b. In this case, the condensing lens can function to condense the light emitted from the LEDs 111a, 111b, and 111c, whereas the collimating lens can function to convert the light condensed by the condensing lens into a collimated light, and then to send the collimated light to the synthesizer 112.

The integrator 113 is arranged on the light incidence path I of the image projection unit 120. The integrator 113 shapes the light emerging from the first and second dichroic mirrors 112a and 112b such that the light has a uniform intensity. The integrator 113 may include at least one of a fly eye lens, a rod lens, a light tunnel or funnel having a box-shaped mirror, or a trapezoidal light funnel.

Meanwhile, the reflection mirror 170 is disposed between the dichroic mirror 112b and the integrator 113, and reflects the light emerging from the first and second dichroic mirrors 112a and 112b by an angle $\theta_1$ defined within a negative (−) acute angle range larger than 180°, but smaller than 270° such that the reflected light is directed to the integrator 113 arranged on the light incidence path I.

That is, in accordance with the first embodiment of the present invention, the light incidence path I and the light outgoing path II form an acute angle $\theta_1$, for example, the angle $\theta_1$ defined within the negative (−) acute angle range, and the integrator 113 and image projection unit 120 are arranged on the light incidence path I and light outgoing path II, respectively. Further, the light paths I and II between the integrator 113 and the external screen form an acute angle.

In the example of FIG. 3, the image projection unit 120 is arranged beneath or below the illumination optical unit 110. For example, the reflection mirror 170 reflects the light from the dichroic mirrors 112a and 112b in a downward acute angle direction. Accordingly, it is possible to reduce the total system length of the projection display device, and thus to minimize or reduce the size of the projection display device, as compared to the related art projection display devices.

Figure 4:
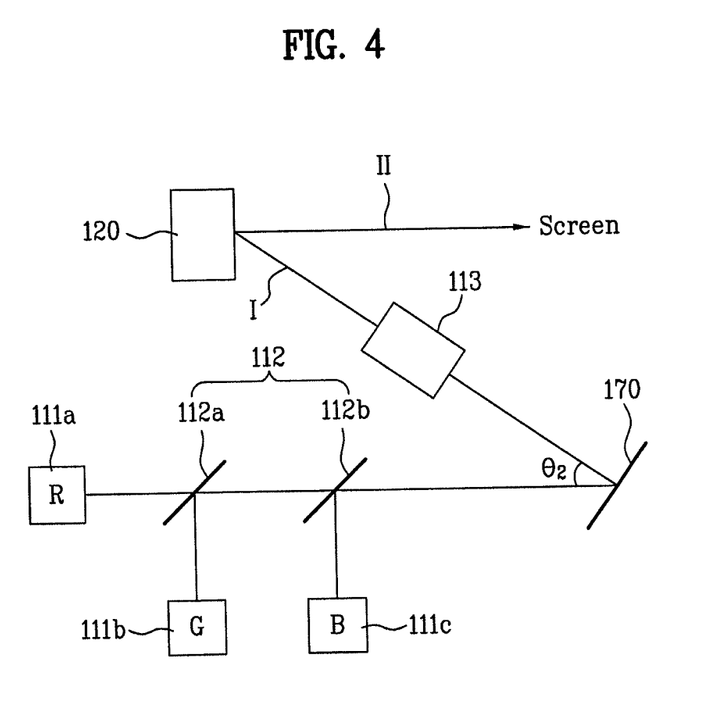
FIG. 4 is a schematic view illustrating a second embodiment of a projection display device according to the present invention.

FIG. 4 is a schematic view illustrating a second embodiment of the projection display device according to the present invention.

Referring to FIG. 4, the reflection mirror 170 according to the second embodiment of the present invention reflects the light emerging from the first and second dichroic mirrors 112a and 112b by an angle $\theta_2$ defined within a positive (+) acute angle range larger than 0°, but smaller than 90° such that the reflected light is directed to the integrator 113 arranged on the light incidence path I.

That is, in accordance with the second embodiment of the present invention, the light incident on the reflection mirror 170 and the light reflected from the reflection mirror 170 form an acute angle $\theta_2$. Further, the light incidence path I and the light outgoing path II form the angle $\theta_2$ defined within the positive (+) acute angle range, where the integrator 113 and image projection unit 120 are arranged on the light incidence path I and light outgoing path II, respectively.

Moreover, in the example of FIG. 4, the image projection unit 120 is arranged over or above the illumination optical unit 110. For example, the reflection mirror 170 reflects the light from the dichroic mirrors 112a and 112b in an upward acute angle direction. Accordingly, it is possible to reduce the total system length of the projection display device, and thus to minimize or reduce the size of the projection display device, as compared to the related art projection display devices.

Figure 5:
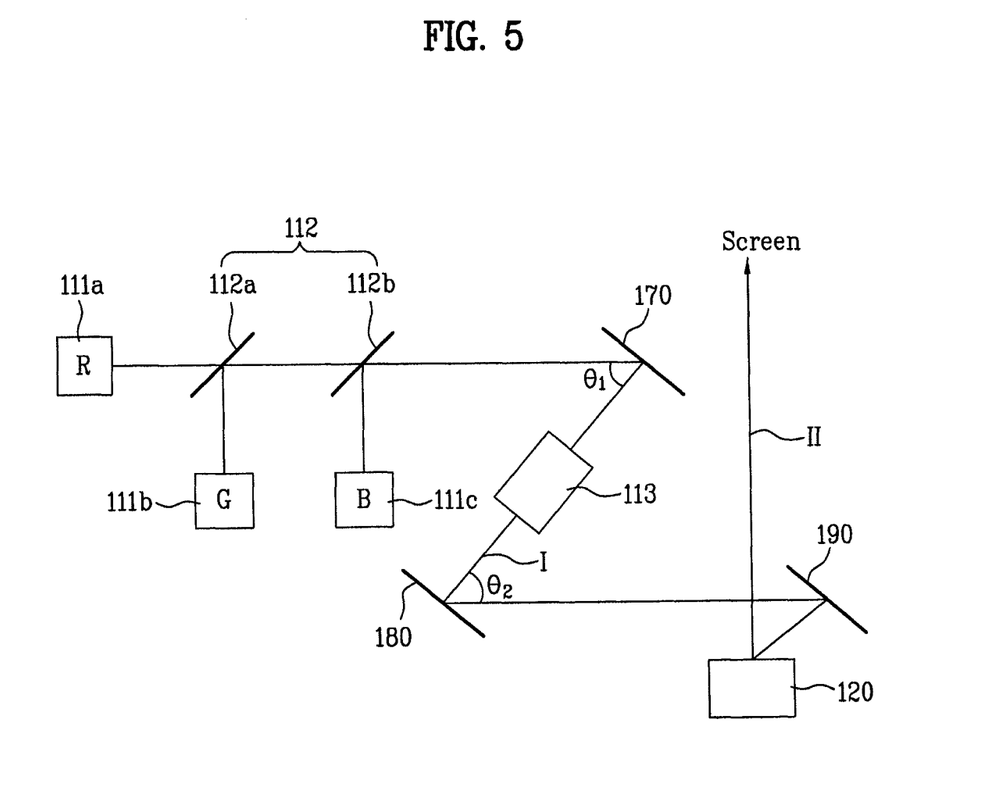
FIG. 5 is a schematic view illustrating a third embodiment of a projection display device according to the present invention.

FIG. 5 is a schematic view illustrating a third embodiment of the projection display device according to the present invention.

Referring to FIG. 5, the projection display device according to the third embodiment includes a plurality of reflection mirrors, for example, first and second reflection mirrors 170 and 180.

The first reflection mirror 170 reflects the light emerging from the first and second dichroic mirrors 112a and 112b by an acute angle, e.g., an angle $\theta_1$ defined within a negative (−) acute angle range larger than 180°, but smaller than 270°, such that the reflected light is directed to the integrator 113 arranged on the light incidence path I. Further, the integrator 113 is disposed below the first reflection mirror 170.

The second reflection mirror 180 reflects the light emerging from the integrator 113 by an acute angle, e.g., an angle $\theta_2$ defined within a positive (+) acute angle range larger than 0°, but smaller than 90°, such that the reflected light is directed towards the image projection unit 120 arranged on the light outgoing path II.

Thus, it is possible to minimize or reduce the overall size of the projection display device by adjusting the angle between the light incidence path I and the light outgoing path II such that the angle is within an acute angle range, and arranging the integrator 113 and image projection unit 120 on the adjusted light incidence path I and light outgoing path II, respectively.

In each projection display device of FIG. 3, 4 or 5, the image projection unit 120 produces an image, using the light emerging from the optical path unit 120, under the control of the control unit 160, and then projects the produced image onto an external screen, to display the image.

The image projection unit 120 may be classified into a display panel type or a scanner type, but can be of a different type. Hereinafter, two examples of the configuration of the image projection unit 120, which is of a display panel type, will be described with reference to FIGS. 6A and 6B.

Figure 6A:
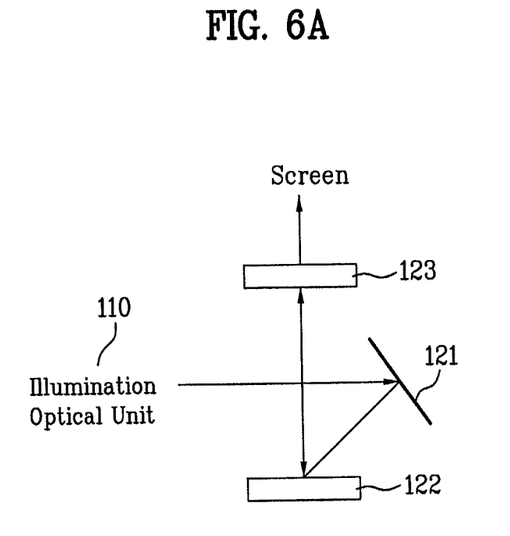
FIGS. 6A and 6B are schematic views illustrating two examples of a configuration of a display panel type image projection unit according to the present invention.
Figure 6B:
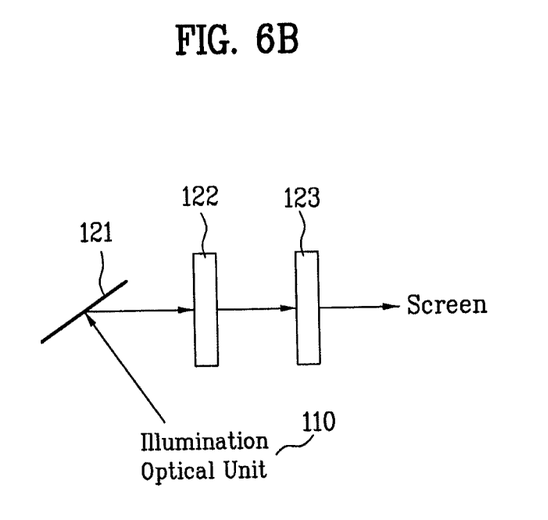

Referring to FIGS. 6A and 6B, the display panel type image projection unit 120 according to an embodiment of the present invention includes a reflection plate 121, a display panel 122, and a projection lens 123. The display panel 122 receives the light emerging from the integrator 113 via the reflection plate 121, and projects an image onto the screen, using the received light. The display panel 122 may comprise a reflection type imaging unit such as a digital micro mirror device or a reflection type liquid crystal display device, or a transmission type imaging unit. The reflection type imaging unit selectively reflects the incident light by pixels, to form an image, whereas the transmission type imaging unit may selectively transmit the incident light to form an image.

Meanwhile, the projection lens 123 projects the image produced by the display panel 122 onto the screen in an enlarged state.

The display panel type image projection unit 120 shown in FIG. 6A may be applied to the image projection unit 120 shown in FIG. 5. In this case, a third reflection plate 190 of FIG. 5 corresponds to the reflection plate 121 of FIG. 6A.

On the other hand, the display panel type image projection unit 120 shown in FIG. 6B may be applied to the image projection unit 120 shown in FIG. 3 or 4.

Now, the configuration of the image projection unit 120, which is of a scanner type, will be described with reference to FIGS. 7 to 9.

Figure 7:
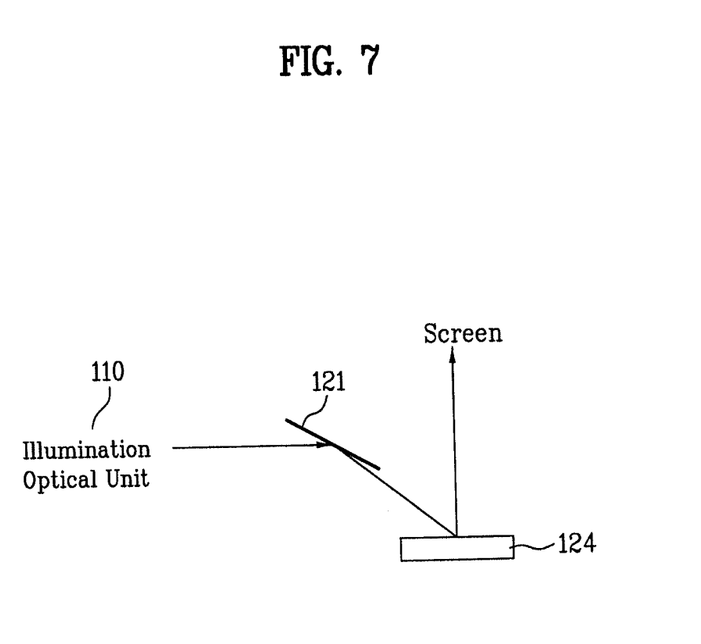
FIG. 7 is a schematic view illustrating an example of a configuration of a scanner type image projection unit according to the present invention.

FIG. 7 is a schematic view illustrating an example of the scanner type image projection unit according to the present invention.

Referring to FIG. 7, the scanner type image projection unit 120 according to the present invention includes a reflection plate 121 and a scanner 124.

Where the scanner type image projection unit 120 of FIG. 7 is applied to the case of FIG. 3 or 4, the reflection plate 121 may be dispensed with. In this case, the light emerging from the integrator 113 may be directly incident to the scanner 124.

On the other hand, where the scanner type image projection unit 120 of FIG. 7 is applied to the case of FIG. 5, the third reflection plate 190 of FIG. 5 may be replaced by the reflection plate 121 of FIG. 7.

The scanner 124 reflects the light received via the reflection plate 121 in a horizontal or vertical direction or in the horizontal and vertical directions, to raster-scan the reflected light onto the screen.

The scanner 124 includes at least one micro scanner having a rotatable mirror. As an example of the micro scanner, a biaxially-driven micro scanner is shown in FIGS. 8 and 9.

Hereinafter, an example of the micro scanner will be described in detail with reference to FIGS. 8 and 9.

Figure 8:
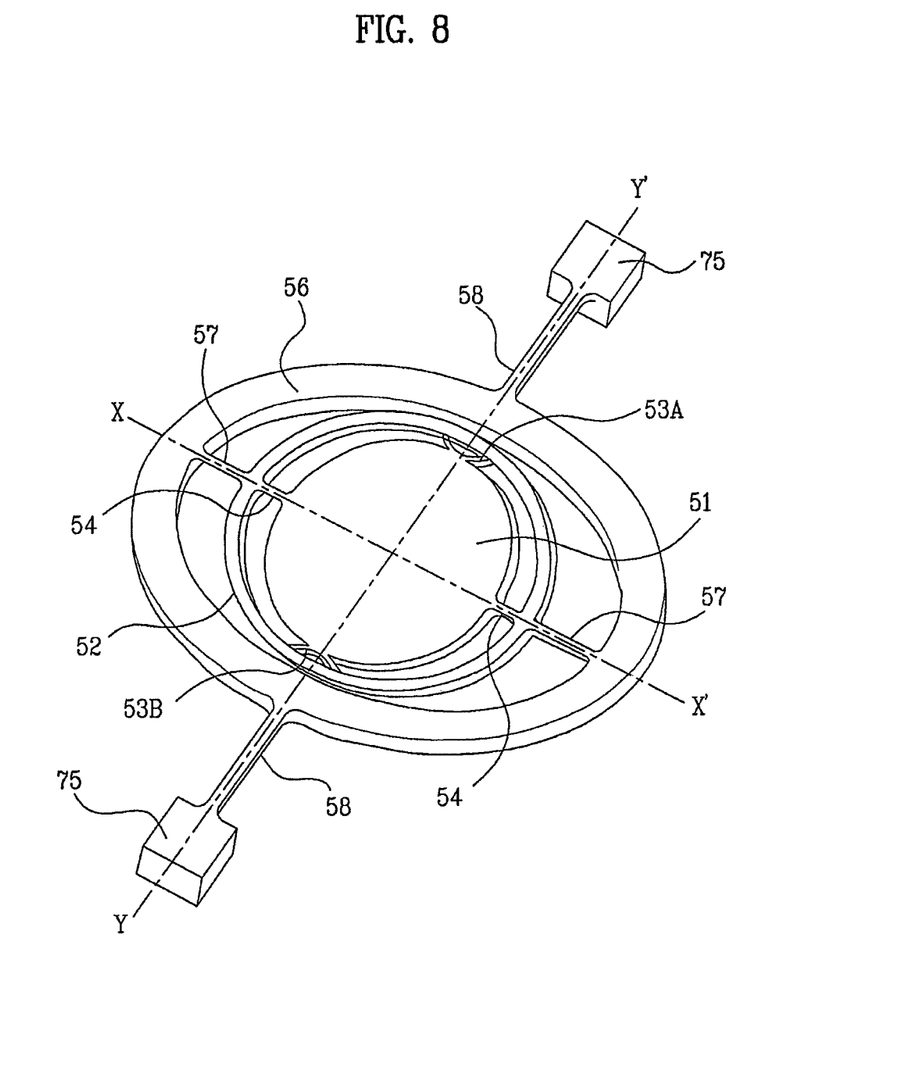
FIG. 8 is a perspective view illustrating an example of a micro scanner according to the present invention.

FIG. 8 is a perspective view illustrating an example of the micro scanner according to the present invention. FIG. 9 is a plan view for explaining connectors provided at the micro scanner of FIG. 8.

Figure 9:
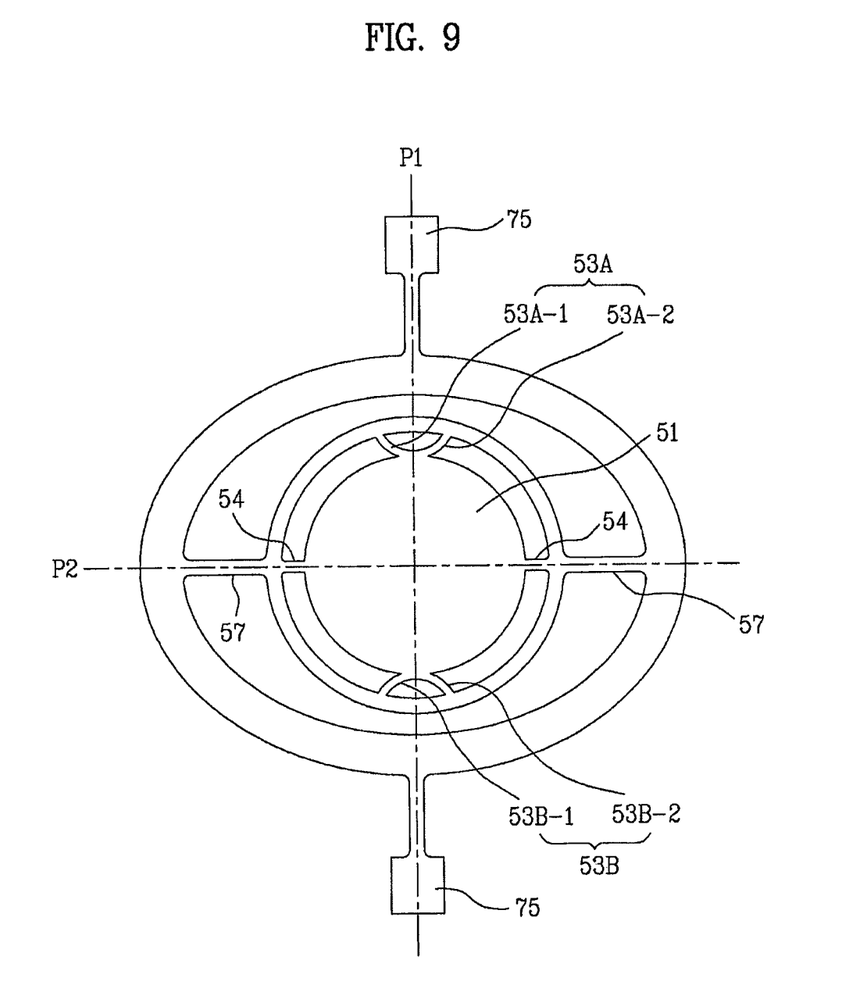
FIG. 9 is a plan view for explaining connectors provided at the micro scanner of FIG. 8.

As shown in FIGS. 8 and 9, the micro scanner includes a mirror plate 51 including a thin film formed with a reflection surface for reflecting a laser light, and a frame arranged beneath the thin film to support the thin film, an outer frame 52 arranged to be outwardly spaced apart from the periphery of the mirror plate 51, a plurality of connectors 53A, 53B, and 54 for connecting the mirror plate 51 and the outer frame 52, and a gimbal 56 arranged to be outwardly spaced apart from the periphery of the outer frame 52. The micro scanner also includes a pair of inner elastic flexible members 57 symmetrically formed with respect to the mirror plate 51, and connected to the gimbal 56 and to the outer frame 52, and a pair of outer elastic flexible structures 58 symmetrically formed with respect to the mirror plate 51, and connected to the gimbal 56 and to a pair of support members 75, to upwardly raise the mirror plate 51, outer frame 52, and gimbal 56.

As shown in FIG. 9, the plural connectors 53A, 53B, and 54 functioning to connect the mirror plate 51 and the outer frame 52 include first connectors, namely, the connectors 54, and second connectors, namely, the connectors 53A and 53B. The second connectors 53A and 53B are formed on a first line P1 connecting the outer elastic flexible members 58 such that they are symmetrical with respect to the mirror plate 51. The first connectors 54 are formed on a second line P2 perpendicular to the first line P1 such that they are symmetrical with respect to the mirror plate 51. The second connector 53A includes two symmetrical portions 53A-1 and 53A-2, whereas the second connector 53B includes two symmetrical portions 53B-1 and 53B-2.

The gimbal 56 is connected to the outer frame 52 by the inner elastic flexible members 57. The gimbal 56 is also connected to the support members 75 by the outer elastic flexible members 58 symmetrically formed on a line perpendicular to the inner elastic flexible members 57.

The outer elastic flexible members 58 connect the gimbal 56 to the support members 75 such that the mirror plate 51, outer frame 52, and gimbal 56 are upwardly raised. In the drawings, only a portion of each support member 75 is schematically shown.

The inner and outer elastic flexible members 57 and 58 provide a recovering torque during operation of the micro mirror while functioning as rotating axes. That is, the outer frame 52 rotates about the inner elastic flexible members 57 as an axis (this axis extends a line X- X', as shown in FIG. 8, and is referred to as an "X-axis"). The gimbal 56 rotates about the outer elastic flexible members 58 as an axis (this axis extends a line Y-Y', as shown in FIG. 8, and is referred to as a "Y-axis").

The micro scanner 124 having the above-described structure can perform rotating operations with 2 axial degrees of freedom. That is, the micro scanner 124 can rotate not only about the inner elastic flexible members 57, namely, the X-axis, but also about the outer elastic flexible members 58, namely, the Y-axis. The axial rotations of the micro scanner 124 do not have influence on each other, so that they can be independently controlled. Accordingly, it is possible to implement a micro mirror capable of being inclined from a 2-dimensional plane by an arbitrary angle.

When the above-described micro scanner 124 is used, the scanning operation is carried out in accordance with a micro rotation of the mirror plate 51. Accordingly, sweeping can be carried out at a very high speed.

Although the embodiments of the present invention have been described in conjunction with particular matters such as concrete constituent elements, the illustrative embodiments and the accompanying drawings, they are intended only to facilitate understanding of the invention. Accordingly, the present invention is not limited to such matters, embodiments and drawings. It will be apparent to those skilled in the art that various modifications and variations can be made in the present invention without departing from the spirit or scope of the inventions.

Thus, it is intended that the present invention is not limited to the above-described embodiments, and covers the modifications and variations of this invention provided they come within the scope of the appended claims and their equivalents.

What is claimed is:

1. A projection display device, comprising:
    an illumination optical unit configured to emit a light for illumination;
    an integrator configured to convert the light emitted from the illumination optical unit into a uniform light;
    an image projection unit configured to receive the uniform light emitted from the integrator and to project a light onto an external screen;
    a first reflection mirror configured to reflect the light emitted from the illumination optical unit to the integrator;
    a second reflection mirror configured to reflect corresponding light emerging from the integrator; and
    a third reflection mirror configured to reflect light reflected from the second reflection mirror to the image projection unit,
    wherein a first optical path is formed between the illumination optical unit and the first reflection mirror,
    wherein a second optical path is formed between the first and second reflection mirrors,
    wherein a third optical path is formed between the second reflection mirror and the third reflection mirror,
    wherein a fourth optical path is formed between the third reflection mirror and the image projection unit,
    wherein a fifth optical path is formed between the image projection unit and the external screen,
    wherein an angle between the first and second optical paths is a first acute angle and an angle between the second and third optical paths is a second acute angle, and
    wherein the third optical path is parallel to the first optical path, the fifth optical path is perpendicular to the first and third optical paths, and a light forward direction of the first optical path is the same as a light forward direction of the third optical path.

2. The projection display device according to claim 1, wherein the first reflection mirror reflects the light emitted from the illumination optical unit in an upward acute angle direction.

3. The projection display device according to claim 1, wherein the first reflection mirror reflects the light emitted from the illumination optical unit in a downward acute angle direction.

4. The projection display device according to claim 1, wherein the illumination optical unit comprises:
    a plurality of light sources configured to emit light beams of different colors, respectively; and
    a synthesizer configured to selectively transmit or reflect the light beams emitted from the light sources in accordance with the colors of the light beams, thereby synthesizing the light beams.

5. The projection display device according to claim 1, wherein the integrator comprises at least one of a fly eye lens, a rod lens, a light tunnel or funnel consisting of a box-shaped mirror, and a trapezoidal light funnel.

6. The projection display device according to claim 1, wherein the image projection unit comprises:
    a panel configured to selectively transmit or reflect the light emerging from the illumination optical unit, thereby forming an image; and
    a projection lens configured to project the light emerging from the panel onto the screen.

7. The projection display device according to claim 1, wherein the image projection unit reflects the light emerging from the illumination optical unit in a horizontal or vertical direction or in the horizontal and vertical directions, to raster-scan the reflected light onto the screen.

* * * * *